US012568023B2

(12) United States Patent
Zhou

(10) Patent No.: US 12,568,023 B2
(45) Date of Patent: Mar. 3, 2026

(54) OFDM PROFILE GENERATION BASED ON SERVICE TIERS

(71) Applicant: Charter Communications Operating, LLC, St. Louis, MO (US)

(72) Inventor: Lei Zhou, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 77 days.

(21) Appl. No.: 18/430,284

(22) Filed: Feb. 1, 2024

(65) Prior Publication Data

US 2025/0254093 A1 Aug. 7, 2025

(51) Int. Cl.
| | |
|---|---|
| *H04L 41/08* | (2022.01) |
| *H04L 5/00* | (2006.01) |
| *H04L 12/28* | (2006.01) |
| *H04L 27/26* | (2006.01) |
| *H04L 41/00* | (2022.01) |
| *H04L 41/0896* | (2022.01) |

(52) U.S. Cl.
CPC ........ *H04L 41/0896* (2013.01); *H04L 5/0007* (2013.01); *H04L 12/2801* (2013.01); *H04L 27/2697* (2013.01); *H04L 41/24* (2013.01)

(58) Field of Classification Search
CPC ............... H04L 41/0896; H04L 5/0007; H04L 12/2801; H04L 27/2697; H04L 41/24
USPC .................................. 375/219–222, 257, 262
See application file for complete search history.

(56) References Cited

U.S. PATENT DOCUMENTS

| | | | | |
|---|---|---|---|---|
| 2015/0188653 A1* | 7/2015 | Hanks | ................. | H04L 27/0012 |
| | | | | 370/203 |
| 2015/0188668 A1* | 7/2015 | Al-banna | .............. | H04L 5/0044 |
| | | | | 370/208 |
| 2017/0141887 A1* | 5/2017 | Garcia | .................... | H04L 43/16 |
| 2018/0287660 A1* | 10/2018 | Arambepola | ....... | H04L 12/2801 |
| 2019/0305876 A1* | 10/2019 | Sundaresan | ........... | H04L 1/0003 |
| 2020/0389239 A1* | 12/2020 | Garcia | .................. | H04L 1/0009 |
| 2022/0322037 A1* | 10/2022 | Rice | ...................... | H04W 24/04 |
| 2024/0389019 A1* | 11/2024 | Kodaypak | ......... | H04W 52/0209 |

OTHER PUBLICATIONS

White, Greg, et al., "DOCSIS 3.1 Profile Management Application and Algorithms," Cable Television Laboratories, Inc., https://www.nctatechnicalpapers.com/Paper/2016/2016-docsis-3-1-profile-management-application-and-algorithms, 2016, 11 pages.

* cited by examiner

*Primary Examiner* — Emmanuel Bayard
(74) *Attorney, Agent, or Firm* — Dority & Manning, P.A.

(57) ABSTRACT

A plurality of cable modems (CMs) serviced by a cable management termination system (CMTS) are identified, each of the CMs being associated with a particular bandwidth service tier of a plurality of bandwidth service tiers. The plurality of CMs are grouped into a quantity of groups of CMs based on the bandwidth service tier with which each CM is associated. A CM orthogonal frequency division multiplexing (OFDM) profile is generated for each respective CM in each group of CMs. A plurality of group OFDM profiles are generated. Each respective group OFDM profile is generated based on the CM OFDM profiles of the CMs in a respective group of CMs and, for each subcarrier of a plurality of subcarriers, a quadrature amplitude modulation (QAM) order is identified.

20 Claims, 7 Drawing Sheets

OFDM PROFILE GENERATION BASED ON SERVICE TIERS

BACKGROUND

Cable modem termination systems (CMTSs) may communicate with cable modems using orthogonal frequency-division multiplexing (OFDM) wherein a channel is divided into subcarriers and the CMTS and cable modem use a particular quadrature amplitude modulation (QAM) order to communicate data over each subcarrier.

SUMMARY

The embodiments disclosed herein implement an OFDM profile generator that utilizes service-layer information, such as bandwidth service tier information, in addition to physical layer information to generate optimal OFDM profiles for the CMs supported by a CMTS.

In one implementation a method is provided. The method includes identifying, by a computing device, a plurality of cable modems (CMs) serviced by a cable management termination system (CMTS), each of the CMs being associated with a particular bandwidth service tier of a plurality of bandwidth service tiers. The method further includes grouping, by the computing device, based on the bandwidth service tier with which each CM is associated, the plurality of CMs into a quantity of groups of CMs. The method further includes generating, for each respective CM in each group of CMs, a CM orthogonal frequency division multiplexing (OFDM) profile. The method further includes generating a plurality of group OFDM profiles, each respective group OFDM profile being generated based on the CM OFDM profiles of the CMs in a respective group of CMs and identifying, for each subcarrier of a plurality of subcarriers, a quadrature amplitude modulation (QAM) order.

In another implementation a computing device is provided. The computing device includes a memory and a processor device coupled to the memory. The processor device is operable to identify a plurality of cable modems (CMs) serviced by a cable management termination system (CMTS), each of the CMs being associated with a particular bandwidth service tier of a plurality of bandwidth service tiers. The processor device is further operable to group, based on the bandwidth service tier with which each CM is associated, the plurality of CMs into a quantity of groups of CMs. The processor device is further operable to generate, for each respective CM in each group of CMs, a CM orthogonal frequency division multiplexing (OFDM) profile. The processor device is further operable to generate a plurality of group OFDM profiles, each respective group OFDM profile being generated based on the CM OFDM profiles of the CMs in a respective group of CMs and identifying, for each subcarrier of a plurality of subcarriers, a QAM order.

In another implementation a non-transitory computer-readable storage medium is provided. The non-transitory computer-readable storage medium includes executable instructions to cause a processor device to identify a plurality of cable modems (CMs) serviced by a cable management termination system (CMTS), each of the CMs being associated with a particular bandwidth service tier of a plurality of bandwidth service tiers. The instructions further cause the processor device to group, based on the bandwidth service tier with which each CM is associated, the plurality of CMs into a quantity of groups of CMs. The instructions further cause the processor device to generate, for each respective CM in each group of CMs, a CM orthogonal frequency division multiplexing (OFDM) profile. The instructions further cause the processor device to generate a plurality of group OFDM profiles, each respective group OFDM profile being generated based on the CM OFDM profiles of the CMs in a respective group of CMs and identifying, for each subcarrier of a plurality of subcarriers, a QAM order.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
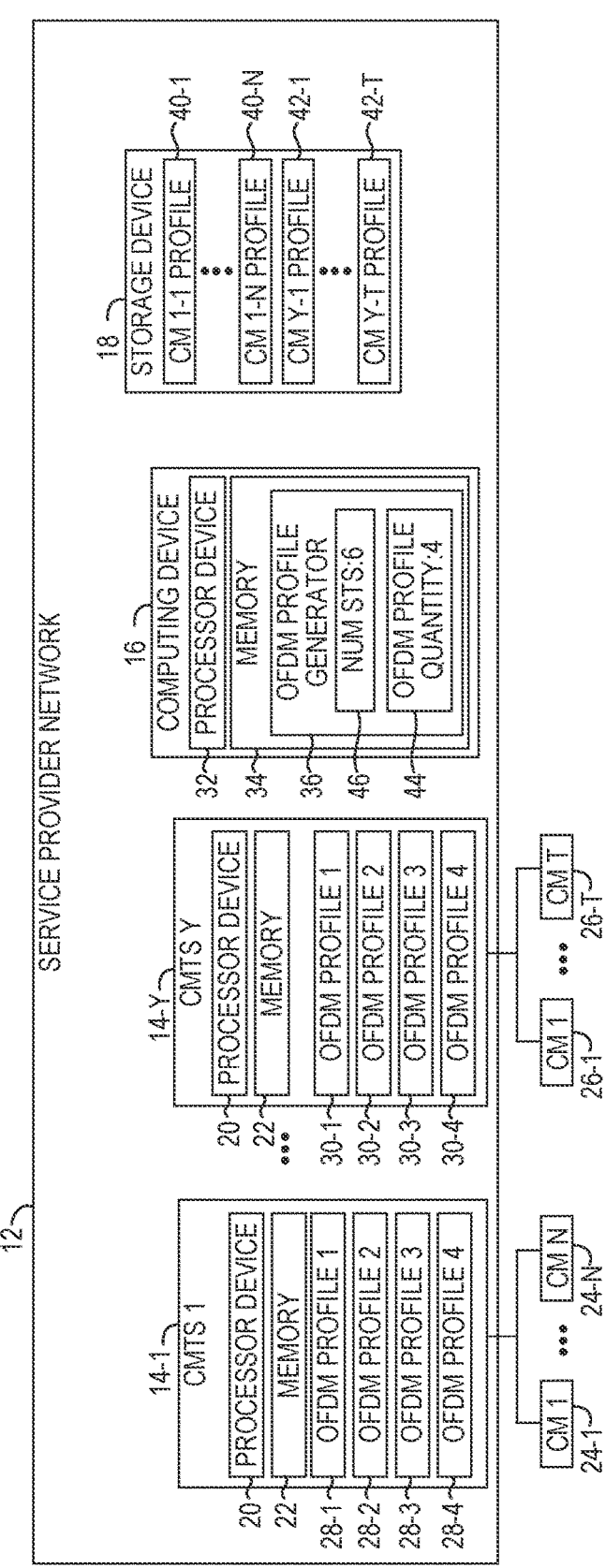
FIG. 1 is a block diagram of an environment in which orthogonal frequency-division multiplexing (OFDM) profile generation based on service tiers can be practiced according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Cable modem termination systems (CMTSs) may communicate with cable modems (CMs) using the Data Over Cable Service Interface Specification (DOCSIS) telecommunications standard. DOCSIS 3.1 and later utilizes an orthogonal frequency-division multiplexing (OFDM) modulation scheme on the downstream and orthogonal frequency-division multiple access (OFDMA) on the upstream. OFDM divides a channel into multiple subcarriers and the CMTS and CM use a particular quadrature amplitude modulation (QAM) order to communicate data over each subcarrier. QAM is a modulation scheme that allows multiple bits to be communicated in a single constellation. The number of bits communicated in a particular constellation is determined by the particular QAM modulation order (hereinafter "QAM order" for the sake of brevity) that is used by the CMTS and the CM for a particular subcarrier. For example, a 64-QAM order carries 6 bits per constellation (sometimes referred to as a symbol), a 256-QAM order carries 8 bits per constellation, a 1024-QAM order carries 10 bits per constellation, and a 4096-QAM order carries 12 bits per constellation.

The wired media between a CM and a CMTS may be miles long and can be subject to a frequency-selective fading. By using different QAM orders with different subcarriers, a "water-filling" effect can result and the information-theoretical capacity of the channel spectrum can be closely approached. Varying QAM orders per subcarrier is sometimes referred to as the "bit-loading" of OFDM signals.

In DOCSIS a bit-loading plan is referred to as an OFDM profile. Ideally, a separate OFDM profile would be used in the communications between a CMTS and each CM. However, in practice, there are two constraints to OFDM profile management. One constraint is that only a limited number of profiles can be configured on a CMTS. This constraint implies that a group of CMs have to use one OFDM profile that will be sub-optimal to at least some of the group members. Another constraint is that digital modulations only permit certain QAM orders for bit-loading. Often, only 256, 1024 and 4096-QAM orders can be used. In other words, the OFDM profiling can only allocate 8, 10 or 12 bits to a subcarrier.

The embodiments disclosed herein implement an OFDM profile generator that utilizes service-layer information, such as CM bandwidth service tier information, in addition to physical layer information to generate optimal OFDM profiles for the CMs supported by a CMTS. The embodiments herein greatly reduce the time needed to generate a set of OFDM profiles and thus new sets of OFDM profiles can be generated more frequently to address changes in an environment that may impact the conditions of the subcarriers over time. The embodiments herein improve the network capacity of communications between a CMTS and the CMs supported by the CMTS.

FIG. 1 is a block diagram of an environment 10 in which OFDM profile generation based on service tiers can be practiced according to some implementations. The environment 10 includes a service provider network 12, which in turn includes a plurality of CMTSs 14-1-14-Y, a computing device 16 and a storage device 18. The CMTSs 14-1-14-Y may number in the tens, hundreds or thousands. The CMTS 14-1 includes a processor device 20 and a memory 22. The CMTS 14-1 services (e.g., communicates with), a plurality of CMs 24-1-24-N (generally, CMs 24). The number of CMs 24 may be, for example, thousands of CMs 24, tens of thousands of CMs 24 or hundreds of thousands of CMs 24.

Similarly, the CMTS 14-Y includes a processor device 20 and a memory 22. The CMTS 14-Y services (e.g., communicates with), a plurality of CMs 26-1-24-T (generally, CMs 26). Again, the number of CMs 26 may be, for example, thousands of CMs 26, tens of thousands of CMs 26 or hundreds of thousands of CMs 26.

The CMTS 14-1 also has a limit of four OFDM profiles 30-1-30-4, and thus communicates with each CM 24 using one of the four OFDM profiles 30-1-30-4 (generally, OFDM profiles 28). Each OFDM profile 28 identifies, for each subcarrier of a plurality of subcarriers, a QAM order to be used by the CMTS 14-1 and the groups of CMs 24 to which the respective OFDM profile 28 has been assigned to communicate with one another. An OFDM profile 28 may identify a particular QAM order for each of thousands of subcarriers that are used by the CMTS 14-1 and a CM 24 to communicate with one another. For example, the CM 24-1 may be assigned the OFDM profile 28-1, and the CMTS 14-1 and the CM 24-1 carry out OFDM modulation in accordance with the QAM orders identified in the OFDM profile 28-1. The CM 24-N may be assigned the OFDM profile 28-3, and the CMTS 14-1 and the CM 24-N carry out OFDM modulation in accordance with the QAM orders identified in the OFDM profile 28-3.

The CMTS 14-Y has a limit of five OFDM profiles 30-1-30-5, and thus communicates with each CM 26 via one of the five OFDM profiles 30 (generally, OFDM profiles 30).

The computing device 16 includes a processor device 32 and a memory 34. The computing device 16 includes an OFDM profile generator 36 that, as will be discussed in greater detail herein, generates OFDM profiles based in part on a service tier of a CM 24. The computing device 16 includes or is communicatively coupled to a storage device 38 that includes information about each CM in the form of CM profiles 40-1-40-N (generally, CM profiles 40) through 42-1-42-T (generally, CM profiles 42). The CM profiles 40-1-40-N correspond to the CMs 24-1-24-N, and the CM profiles 42-1-42-T correspond to the CMs 26-1-26-T. Often a service provider offers different service tiers to its customers, and each service tier may offer a different data transfer speed and have a different subscriber fee. For example, one service tier may offer a 10 Megabit per second (Mbps) download speed for a certain monthly fee, and another service tier may offer a 1 Gigabit per second (Gbps) download speed for a higher monthly fee. For purposes of discussion herein, it will be assumed that the particular service tier associated with the CMs 24 and CMs 26 are identified in the corresponding CM profiles 40 and 42, respectively, however, it is noted that the identification of the particular service tier with which a CM 24, 26 is associated may be maintained elsewhere, including, for example, by the CMTSs 14-1 and 14-Y. The CM profiles 40 and 42 may also identify the particular CMTS 14 that services the CMs 24 and 26 that correspond to the CM profiles 40 and 42.

With this background, an example of OFDM profile generation based on service tiers will now be discussed. In this example the OFDM profile generator 36 will determine four OFDM profiles for use by the CMTS 14-1 to communicate with the CMs 24. The OFDM profile generator 36 determines a quantity 44 of OFDM profiles that are to be generated for the CMTS 14-1. The quantity 44 of OFDM profiles may be based on a maximum number of OFDM profiles supported by the CMTS 14-1, or may be less than the maximum number of OFDM profiles supported by the CMTS 14-1. The quantity 44 of OFDM profiles may be obtained, for example, by querying the CMTS 14-1, may be a configuration option of the OFDM profile generator 36, or may be entered by an operator into a user interface of the OFDM profile generator 36. In this example it will be assumed that the quantity 44 of OFDM profiles is four.

The OFDM profile generator 36 identifies the plurality of CMs 24 that are serviced by the CMTS 14-1. The OFDM profile generator 36 may determine which CMs 24 are serviced by the CMTS 14-1 by querying the CMTS 14-1, by accessing the CM profiles 40-1-40-N through and 42-1-42-T and determining based on the CM profiles 40-1-40-N through 42-1-42-T that the CMs 24 are serviced by the CMTS 14-1, or in any other suitable manner. The OFDM profile generator 36 determines, based on the profiles 40, a number of service tiers 46 that are associated with the CMs 24, in this example six.

The OFDM profile generator 36 generates groups of CMs 24 equal to the number of service tiers 46 based on the bandwidth service tier of each CM 24, such that each group of CMs 24 is in the same service tier. If the number of service tiers 46, in this example six, is greater than the OFDM profile quantity 44, in this example four, then the OFDM profile generator 36 combines groups of CMs 24 until the number/quantity of groups of CMs 24 matches the OFDM profile quantity 44.

The OFDM profile generator 36 then generates, for each respective CM 24 in each group of CMs 24, a CM OFDM profile for the respective CM 24. The OFDM profile generator 36 then generates a plurality of group OFDM profiles, each respective group OFDM profile being generated based on the CM OFDM profiles of the CMs 24 in the respective group.

It is noted that, because the OFDM profile generator 36 is a component of the computing device 16, functionality implemented by the OFDM profile generator 36 may be attributed to the computing device 16 generally. Moreover, in examples where the OFDM profile generator 36 comprises software instructions that program the processor device 32 to carry out functionality discussed herein, functionality implemented by the OFDM profile generator 36 may be attributed herein to the processor device 32.

Figure 2:
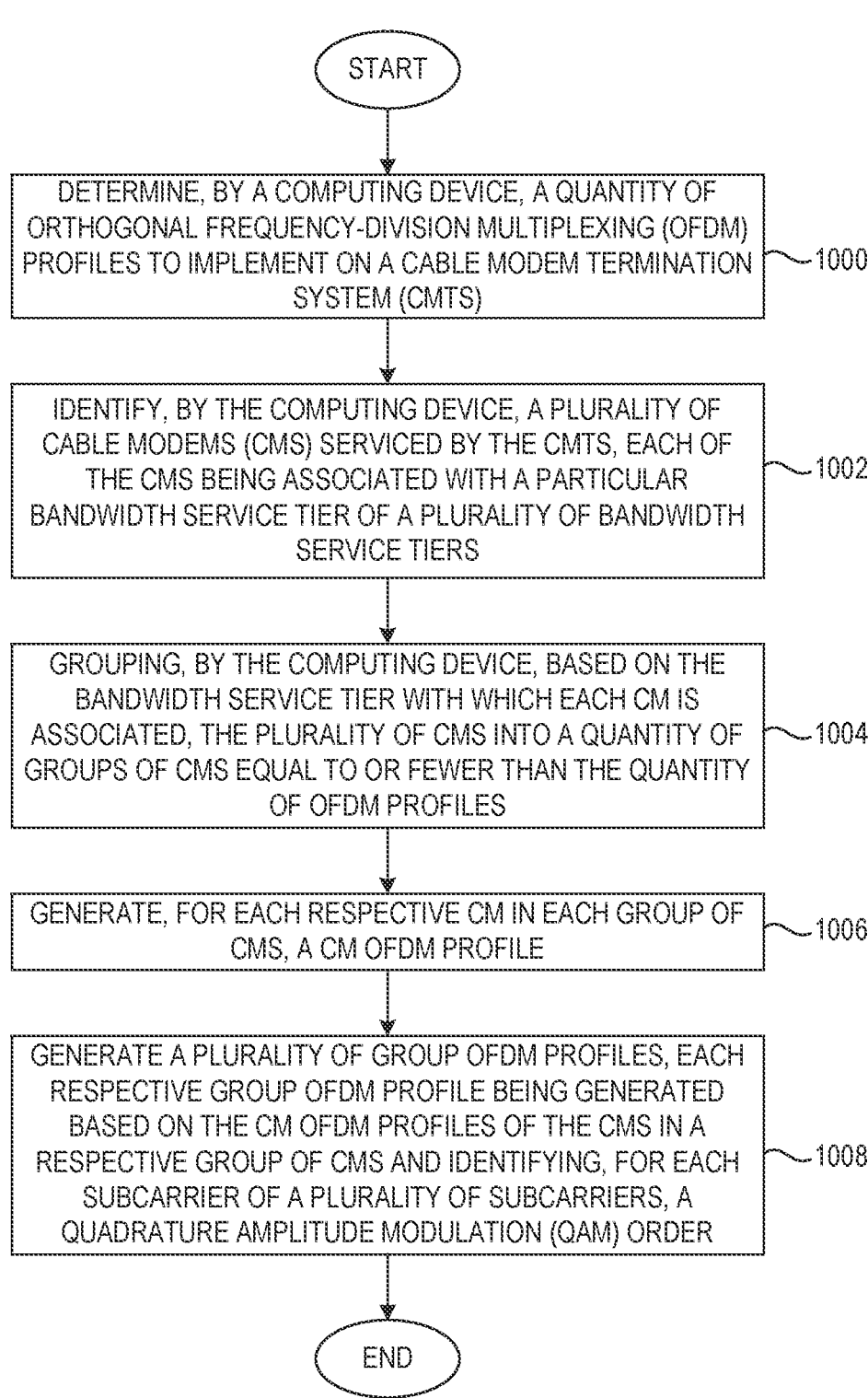
FIG. 2 is a flowchart of a method for OFDM profile generation based on service tiers according to one example.

FIG. 2 is a flowchart of a method for OFDM profile generation based on service tiers according to some implementations. FIG. 2 will be discussed in conjunction with FIG. 1. The computing device 16 determines the quantity 44 of OFDM profiles to implement on the CMTS 14-1 (FIG. 2, block 1000). The computing device 16 identifies the plurality of CMs 24-1-24-N serviced by the CMTS 14-1, each of the CMs 24 being associated with a particular bandwidth service tier of a plurality of bandwidth service tiers (FIG. 2, block 1002). The computing device 16 groups, based on the bandwidth service tier with which each CM 24 is associated, the plurality of CMs 24 into a quantity of groups of CMs 24 equal to or fewer than the quantity 44 of OFDM profiles (FIG. 2, block 1004). The computing device 16 generates, for each respective CM 24 in each group of CMs 24, a CM OFDM profile (FIG. 2, block 1006). The computing device 16 generates a plurality of group OFDM profiles, each respective group OFDM profile being generated based on the CM OFDM profiles of the CMs 24 in a respective group of CMs 24 and identifying, for each subcarrier of a plurality of subcarriers, a QAM order (FIG. 2, block 1008).

Figure 3:
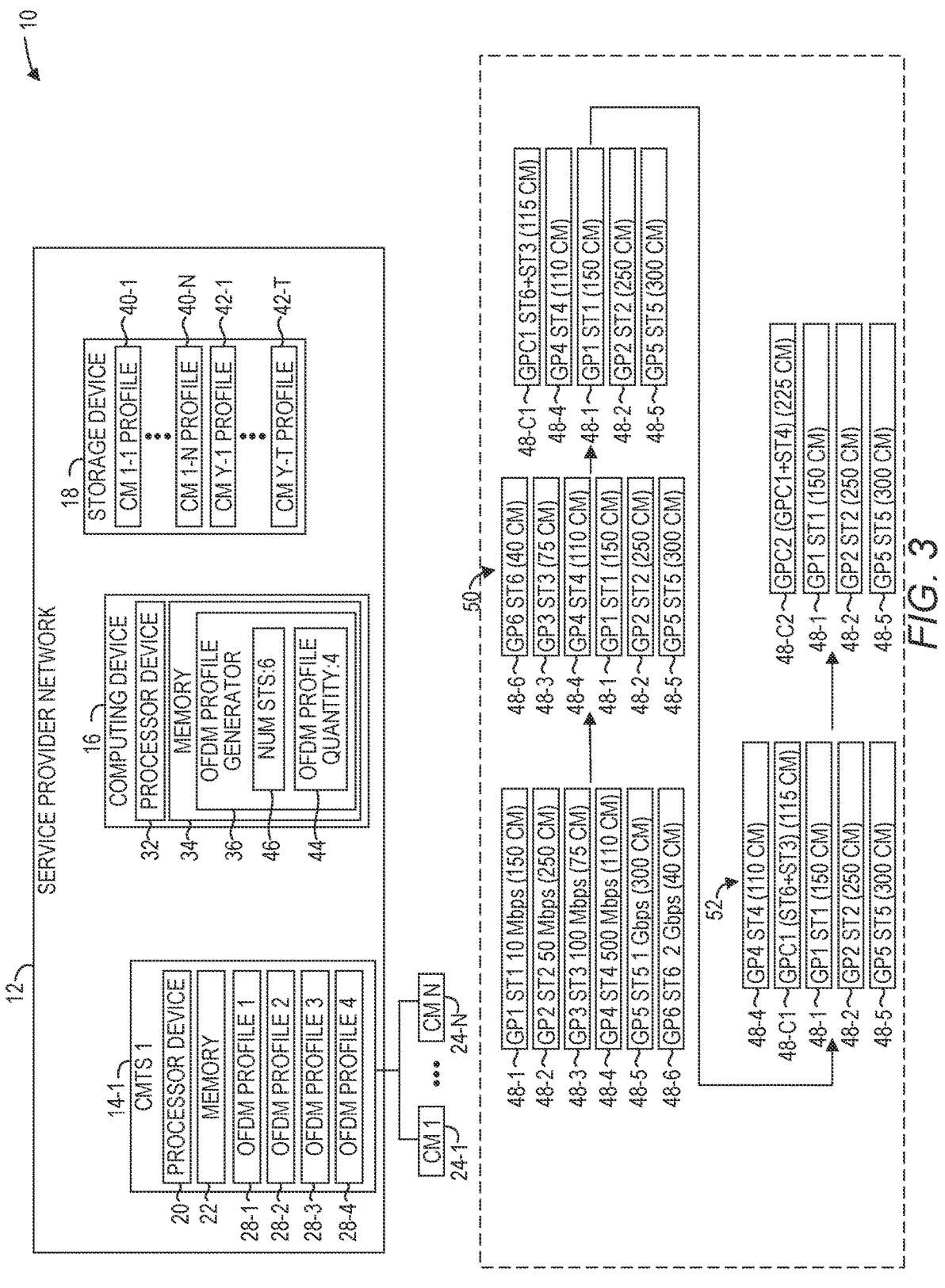
FIG. 3 is a block diagram illustrating an example implementation of grouping cable modems (CMs) serviced by a cable modem termination system (CMTS) when the number of bandwidth service tiers associated with the CMs exceeds a quantity of OFDM profiles to be generated.

FIG. 3 is a block diagram illustrating an example implementation of block 1004 of FIG. 2 regarding the grouping of CMs serviced by a CMTS 14 when the number of bandwidth service tiers associated with the CMs exceeds the quantity 44 of OFDM profiles to be generated for the CMTS 14. It will be assumed for purposes of illustration that four OFDM group profiles are to be generated for the CMTS 14-1, (e.g., that the quantity 44 of OFDM profiles is four), that the CMTS 14-1 services the CMs 24-1-24-N, and that there are nine hundred twenty-five (925) CMs 24. The OFDM profile generator 36 initially generates a plurality of groups 48-1-48-6 of CMs 24, each group 48-1-48-6 of CMs 24 comprising those CMs 24 of the plurality of CMs 24 in a same bandwidth service tier. As discussed above, the OFDM profile generator 36 may determine the service tier with which a CM 24 is associated based on the CM profiles 40 (FIG. 1), by querying the CMTS 14-1, or in any other suitable manner.

The group 48-1 of CMs 24 corresponds to a 10 Mbps service tier, and will be referred to as service tier 1 (ST1). The group 48-1 of CMs 24 identifies 150 CMs 24 that are in ST1. The group 48-2 of CMs 24 corresponds to a 50 Mbps service tier, and will be referred to as service tier 2 (ST2). The group 48-2 of CMs 24 identifies 250 CMs 24 that are in ST2. The group 48-3 of CMs 24 corresponds to a 100 Mbps service tier, and will be referred to as service tier 3 (ST3). The group 48-3 of CMs 24 identifies 75 CMs 24 that are in ST3. The group 48-4 of CMs 24 corresponds to a 500 Mbps service tier, and will be referred to as service tier 4 (ST4). The group 48-4 of CMs 24 identifies 110 CMs 24 that are in ST4. The group 48-5 of CMs 24 corresponds to a 1 Gbps service tier, and will be referred to as service tier 5 (ST5). The group 48-5 of CMs 24 identifies 300 CMs 24 that are in ST5. The group 48-6 of CMs 24 corresponds to a 2 Gbps service tier, and will be referred to as service tier 6 (ST6). The group 48-6 of CMs 24 identifies 40 CMs 24 that are in ST6.

The OFDM profile generator 36 determines that the number of groups 48-1-48-6 of CMs 24 is greater than the quantity 44 of OFDM profiles, which in this example is four. If the number of groups 48-1-48-6 of CMs 24 were equal to or less than quantity 44 of OFDM profiles, then the OFDM profile generator 36 would end the group combining process because there would be no need to further combine the groups 48-1-48-6 of CMs 24. The OFDM profile generator 36 generates a sorted list 50 of the plurality of groups 48-1-48-6 of CMs 24 based on a quantity of CMs 24 in each group 48-1-48-6 of CMs 24. The sorted list 50 identifies the groups 48-6, 48-3, 48-4, 48-1, 48-2 and 48-5 in ascending order of the quantity of CMs 24 in each group.

The OFDM profile generator 36 combines two groups of CMs 24 in the list having the least quantity of CMs, in this example the group 48-6 of CMs 24 and the group 48-3 of CMs 24 to form a new group 48-C1 of CMs 24 that has count of one hundred fifteen (115) CMs 24, resulting in groups 48-C1, 48-1, 48-2, 48-4, and 48-5 now remaining. The OFDM profile generator 36 repeats the sorting and combining processes until the number of groups of CMs 24 is equal to the quantity 44 of OFDM profiles. In this example, the OFDM profile generator 36 generates another sorted list 52 of the plurality of groups 48-C1, 48-1, 48-2, 48-4, and 48-5 based on a quantity of CMs 24 in each of the groups 48-C1, 48-1, 48-2, 48-4, and 48-5. The sorted list 52 identifies the groups 48-4, 48-C1, 48-1, 48-2, and 48-5 in ascending order of the quantity of CMs 24 in each group. The OFDM profile generator 36 combines two groups in the list having a least quantity of CMs 24, in this example the group 48-4 of CMs 24 and the group 48-C1 of CMs 24 to form a new group 48-C2 of CMs 24 that has a count of two hundred twenty-five (225) CMs 24, resulting in groups 48-C2, 48-1, 48-2, and 48-5 now remaining. The OFDM profile generator 36 determines that the quantity of groups 48-C2, 48-1, 48-2, and 48-5 is equal to the quantity 44 of OFDM profiles that are to be generated for the CMTS 14-1, and thus ends the group combining process.

Figure 4:
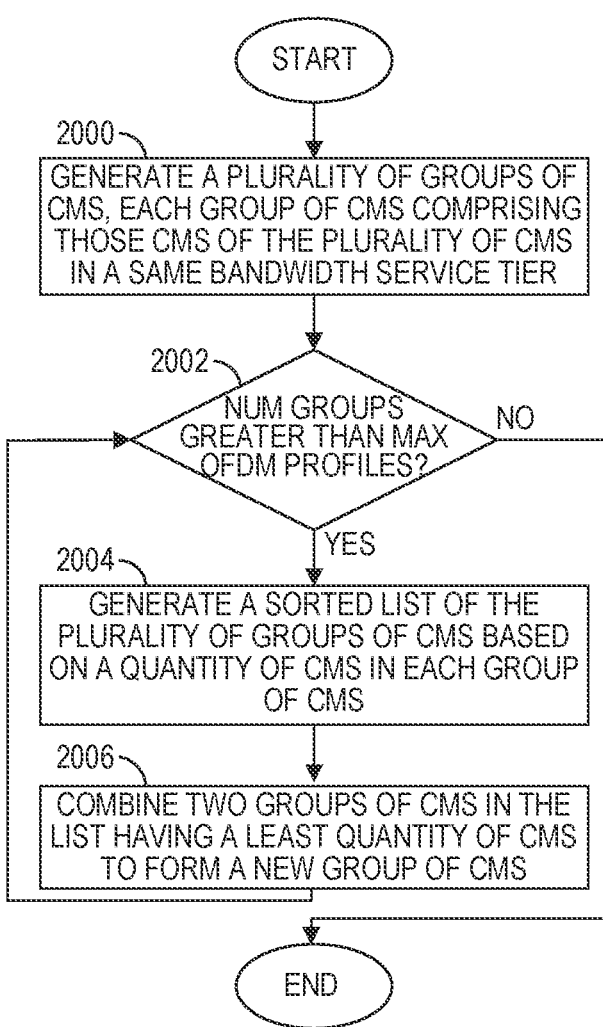
FIG. 4 is a flowchart of a method for grouping CMs serviced by a CMTS when the number of bandwidth service tiers associated with the CMs exceed the quantity of OFDM profiles to be generated according to one implementation.

FIG. 4 is a flowchart of a method for grouping of CMs serviced by a CMTS 14 when the number of bandwidth service tiers associated with the CMs exceed the quantity of OFDM profiles to be generated for a CMTS 14. FIG. 4 will be discussed in conjunction with FIG. 3. The OFDM profile generator 36 generates the plurality of groups 48-1-48-6 of CMs 24, each group of CMs 24 comprising those CMs 24 of the plurality of CMs 24 in a same bandwidth service tier (FIG. 2, step 2000). The OFDM profile generator 36 determines that the number of groups 48-1-48-6 of CMs 24 is greater than the quantity 44 of OFDM profiles (FIG. 2, step 2002).

The OFDM profile generator 36 generates the sorted list 50 of the plurality of groups 48-6, 48-3, 48-4, 48-1, 48-2 and 48-5 of CMs 24 based on a quantity of CMs 24 in each group of CMs 24 (FIG. 2, step 2004). The OFDM profile generator 36 combines the two groups 48-6 and 48-3 in the list 50 having a least quantity of CMs 24 to form the new group 48-C1 of CMs 24 (FIG. 2, step 2006). The OFDM profile generator 36 repeats steps 2002, 2004 and 2006 until at step 2002 the number of groups of CMs 24 is not greater than the quantity 44 of OFDM profiles.

Figure 5:
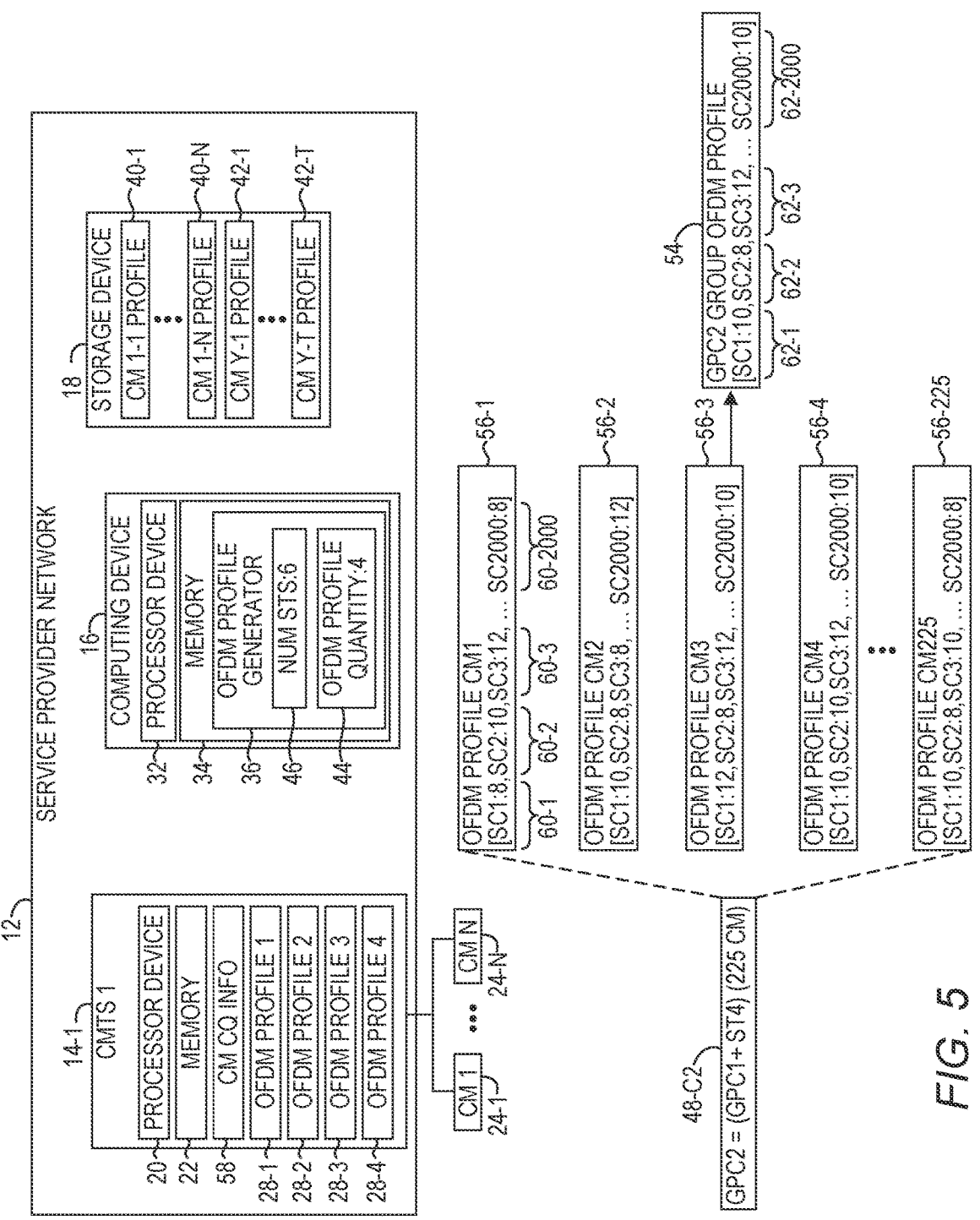
FIG. 5 is a block diagram illustrating an example implementation of generating a group OFDM profile based on the CM OFDM profiles of a group of CMs.

FIG. 5 is a block diagram illustrating an example implementation of block 1008 of FIG. 2 regarding the generation of a group OFDM profile based on the CM OFDM profiles of a group of CMs in a group of CMs. FIG. 5 will discuss the generation of a group OFDM profile 54 based on the group 48-C2 of CMs 24 generated in accordance with FIG. 3. Additional group OFDM profiles would be generated in a similar manner for the groups 48-1, 48-2 and 48-5 illustrated in FIG. 3.

The OFDM profile generator 36 initially generates a corresponding CM OFDM profile 56-1-56-225 (generally, CM OFDM profiles 56) for each of the two hundred twenty five CMs 24 in the group 48-C2 of CMs 24. The OFDM profile generator 36, for each respective CM 24 in the group 48-C2 of CMs 24, determines, for each respective subcarrier of a plurality of subcarriers, a QAM order for the respective subcarrier based at least in part on a signal-to-noise ratio (SNR) for the respective subcarrier for the respective CM 24. The number of subcarriers can be in the tens, hundreds or thousands. In this example, it will be assumed that the group OFDM profiles identify QAM orders for 2000 subcarriers. The OFDM profile generator 36 may obtain the SNR for the respective subcarrier for the respective CM 24 in any suitable manner. In some implementations, the CMTS 14-1 maintains CM channel quality (CQ) information 58 for each of the CMs 24 serviced by the CMTS 14-1. Such CM channel quality (CQ) information 58 may derived based on information provided by the CMs 24, and may include any suitable metrics, including SNR information, that quantifies the conditions of each subcarrier for each CM 24. Such information may be stored by the CMTS 14-1 periodically in a location known to the OFDM profile generator 36, or the OFDM profile generator 36 may query the CMTS 14-1 for such information. The determination of a QAM order for a subcarrier based at least in part on the SNR information will be discussed in greater detail below. In some implementations, the CMs 24 relatively continuously determine the SNR associated with each subcarrier and report the SNRs to the CMTS 14-1.

As an example, for the CM OFDM profile 56-1, the OFDM profile generator 36 determines a QAM order 60-1, QAM 256, for a subcarrier 1 (e.g., "SC1:8"). It is noted that in FIG. 5 the QAM order is designated by the number of bits per QAM constellation, wherein 256-QAM is 8 bits, 1024-QAM is 10 bits, and 4096-QAM is 12 bits. The OFDM profile generator 36 determines a QAM order 60-2, QAM 1024, for a subcarrier 2 (e.g., "SC2:10"), a QAM order 60-3, QAM 1024, for a subcarrier 3 (e.g., "SC3:12"), and a QAM order 60-2000, QAM 256 for a subcarrier 2000 (e.g., "SC2000:8"). The OFDM profile generator 36 similarly determines QAM orders for each of the 2000 subcarriers for each of the 225 CMs 24 in the group 48-C2 of CMs 24.

In one implementation, a CM OFDM profile can be generated in accordance with the following steps. For purposes of discussion, the SNR for CM m on subcarrier i will be denoted as $\gamma_{m,i}$. $\gamma_{margin}$=0(dB) is defined for the current system performance margin, and $\Gamma$ for the SNR Gap. The performance margin is the amount of extra SNR above the level required for the OFDM signals to be received with a tolerable bit-error-rate. This margin provides room to the CM to accommodate unaccounted interferences and impulse noise. SNR Gap $\Gamma$ is a system parameter that is determined by the error-correcting code used in the modulation and coding method used to define the format of the OFDM signal and gives the additional tolerance of noise of the transmitter and receiver in the CMTS and the CM compared to that of a parity system without the error-correcting code. The term "parity system" in this context refers to a CMTS and CM using the same modulation and coding method but without error-correcting code.

The value of $\Gamma$ can be obtained empirically or by calculations for the error-correcting code. $\gamma_{margin}$ is the additional noise tolerance when a particular modulation order is chosen for bit-loading. In calculating the optimal profile for a CM 24, the optimization target is to maximize this $\gamma_{margin}$=0(dB).

Let iteration=0 initially for an iteration counter.

Step a.

For i=1, . . . N, where N is the number of subcarriers of the OFDM system, in this example, 2000, calculate the theoretical modulation order $b_{m,i}$ according to the information-theory formula:

$$b_{m,i} = \log_2\left(1 + \frac{\gamma_{m,i}}{\Gamma + \gamma_{margin}}\right)$$

Then project $b_{m,i}$ to the nearest supported QAM constellation.

$$\hat{b}_{m,i} = \underset{B_c \in \{supported\ constellation\}}{\operatorname{argmin}} (b_{m,i} - B_c)$$

In the above equation $\hat{b}_{m,i}$ is chosen from the closest value of $B_c$ (for example, 8 bits (e.g., QAM 256), 10 bits (e.g., QAM 1024) or 12 bits (e.g., QAM 4096)).

Step b.

Let $$B = \sum_{i=1}^{N} \hat{b}_{m,i},$$

i.e., the total bit-loading of all subcarriers of the OFDM channel. Then renew $\gamma_{margin}$ according to $$\gamma_{margin} = \gamma_{margin} + 10\log_{10}\left(2^{\frac{B-B_t}{N}}\right)$$

where $B_t$ is the desired number of bits per OFDM symbol. $B_t$ is a parameter determined by the system design of the OFDM symbol length. The OFDM symbol length is the duration of an OFDM symbol frame measured by the number of information symbols contained in the frame.

Step c.

Increment iteration by 1. If $B \neq B_t$ and iteration<max iteration, then go to Step a; otherwise stop and record $\hat{b}_{m,i}$ as the QAM order for CM m for subcarrier i.

After determining the CM OFDM profiles 56-1-56-225, the OFDM profile generator 36 generates the group OFDM profile 54 based on the plurality of CM OFDM profiles 56-1-56-225. In one implementation, the OFDM profile generator 36, for each respective subcarrier of the 2000 subcarriers, determines a most occurring QAM order that is identified for the respective subcarrier in the CM OFDM profiles 56. The OFDM profile generator 36 then selects the most occurring QAM order as the QAM order for the respective subcarrier in the group OFDM profile 54.

For example, the OFDM profile generator 36 determines that the most occurring QAM order for subcarrier 1 in the CM OFDM profiles 56-1-56-225 is QAM 1024, and thus stores a QAM order 62-1, QAM 1024, for subcarrier 1 in the group OFDM profile 54. The OFDM profile generator 36 determines that the most occurring QAM order for subcarrier 2 in the CM OFDM profiles 56-1-56-225 is QAM 256, and thus stores a QAM order 62-2, QAM 256, for subcarrier 2 in the group OFDM profile 54. The OFDM profile generator 36 determines that the most occurring QAM order for subcarrier 3 in the CM OFDM profiles 56-1-56-225 is QAM 4096, and thus stores a QAM order 62-3, QAM 4096, for subcarrier 3 in the group OFDM profile 54. The OFDM profile generator 36 determines that the most occurring QAM order for subcarrier 2000 in the CM OFDM profiles 56-1-56-225 is QAM 1024, and thus stores a QAM order 62-2000, QAM 1024, for subcarrier 2000 in the group OFDM profile 54.

The OFDM profile generator 36 repeats this process for each of the groups 48-1, 48-2 and 48-5 illustrated in FIG. 3, to form corresponding group OFDM profiles for the groups 48-1, 48-2 and 48-5. The OFDM profile generator 36 may then communicate the four group OFDM profiles to the CMTS 14-1 for use in communicating with the CMs 24.

Figure 6:
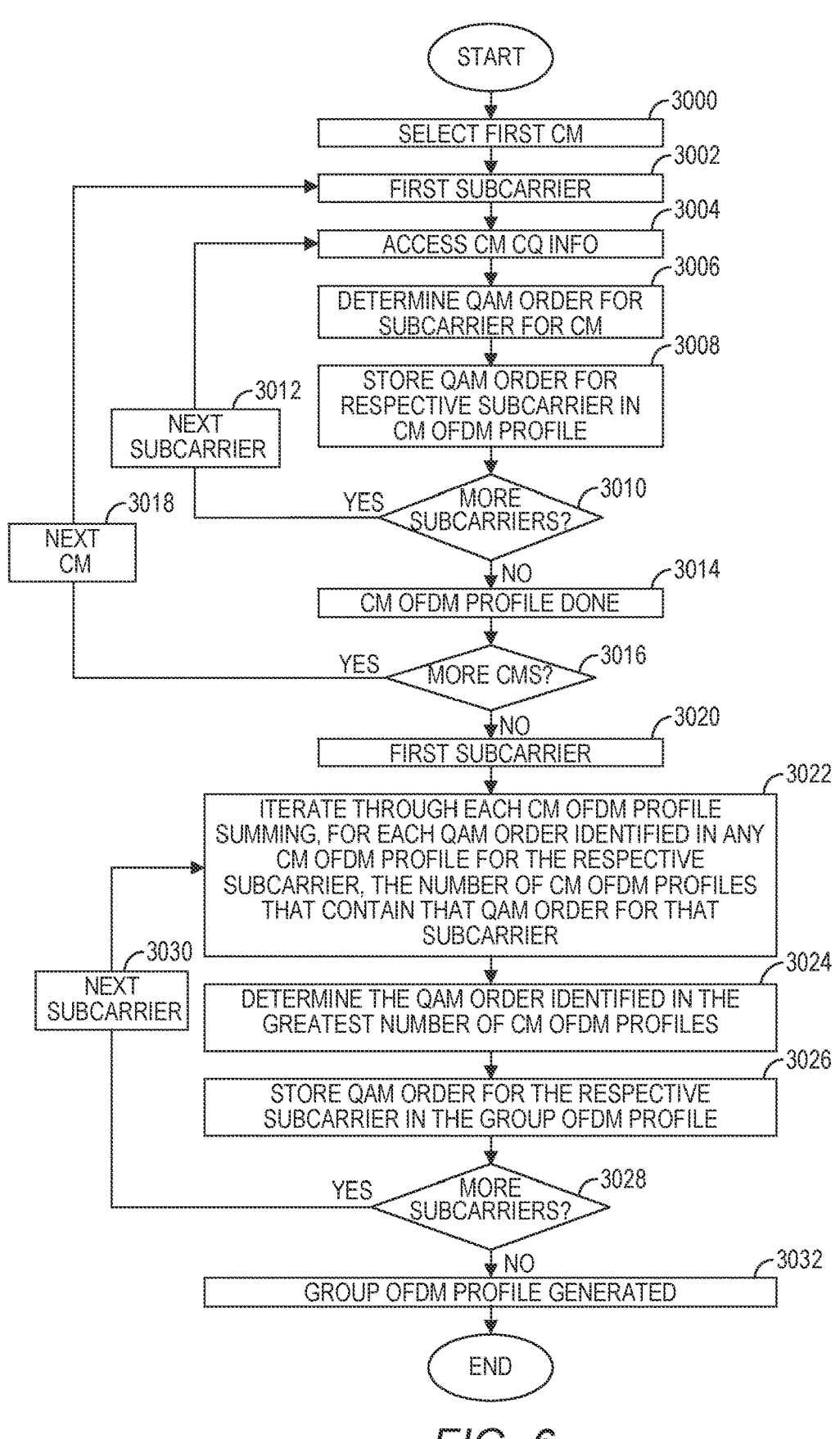
FIG. 6 is a flowchart of a method for generating a group OFDM profile based on the CM OFDM profiles of a group of CMs according to one implementation.

FIG. 6 is a flowchart of a method for generating a group OFDM profile based on the CM OFDM profiles of a group of CMs according to one implementation. FIG. 6 will be discussed in conjunction with FIG. 5. The OFDM profile generator 36 selects the first CM 24 in the group 48-C2 of CMs 24 (FIG. 6, step 3000). The OFDM profile generator 36 starts with the first subcarrier, and accesses the CM channel quality information 58 that corresponds to that subcarrier for that CM 24 (FIG. 6, steps 3002, 3004). The OFDM profile generator 36 determines a particular QAM order for that subcarrier for that CM 24 based at least in part on the CM channel quality information 58 (FIG. 6, step 3006). The OFDM profile generator 36 stores the QAM order in the CM OFDM profile (FIG. 6, step 3008). The OFDM profile generator 36 determines whether there are additional subcarriers for which a QAM order needs to be determined (FIG. 6, step 3010). If so, the OFDM profile generator 36 increments to the next subcarrier, and repeats the process (steps 3012, 3004-3010) until a QAM order has been determined for each subcarrier. If at step 3010 the OFDM profile generator 36 determines that a QAM order has been determined for each subcarrier, the OFDM profile generator 36 determines that the CM OFDM profile is complete (step 3014). The OFDM profile generator 36 determines if there are additional CMs 24 in the group 48-C2 of CMs 24 for which a CM OFDM profile is to be generated (FIG. 6, step 3016). If so, the OFDM profile generator 36 determines the next CM 24 in the group 48-C2 of CMs 24, and repeats the process (steps 3018, 3002-3016) until a CM OFDM profile has been generated for each CM 24 in the group 48-C2 of CMs 24.

If at step 3016 the OFDM profile generator 36 has generated a CM OFDM profile for each CM 24 in the group 48-C2 of CMs 24, the OFDM profile generator 36 starts with the first subcarrier and iterates through each CM OFDM profile to determine a most occurring QAM order of the plurality of QAM orders that is identified for the respective subcarrier in the CM OFDM profiles (steps 3020, 3022). The OFDM profile generator 36 may, for example, sum, for each QAM order identified in any CM OFDM profile for the first subcarrier, the number of CM OFDM profiles that contain that QAM order for the first subcarrier.

The OFDM profile generator 36 selects the most occurring QAM order (e.g., the QAM order identified in the greatest number of CM OFDM profiles) as the QAM order for the first subcarrier in the group OFDM (FIG. 6, step 3024). The OFDM profile generator 36 stores the most occurring QAM order as the QAM order for the first subcarrier in the group OFDM profile 54 (FIG. 6, step 3026). The OFDM profile generator 36 determines whether there are additional subcarriers for which a QAM order needs to be determined (FIG. 6, step 3028). If so, the OFDM profile generator 36 increments to the next subcarrier, and repeats the process (steps 3030, 3022-3028) until a QAM order has been determined for each subcarrier. If at step 3028 the OFDM profile generator 36 determines that a QAM order has been determined for each subcarrier, the OFDM profile generator 36 determines that the group OFDM profile is complete (step 3014). The OFDM profile generator 36 may repeat the steps discussed herein for each of the other groups 48-1, 48-2 and 48-5 to generate corresponding group OFDM profiles.

Figure 7:
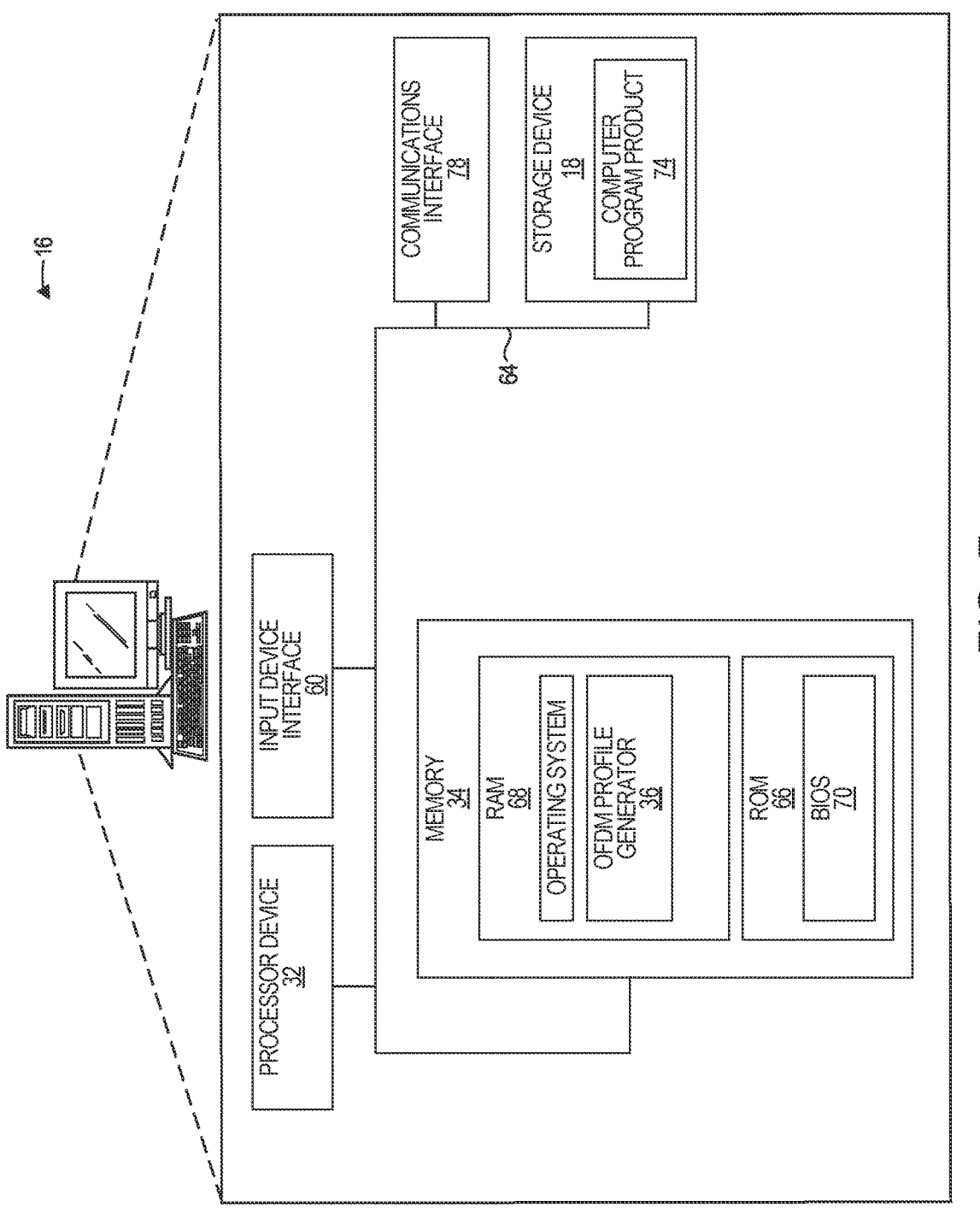
FIG. 7 is a block diagram of a computing device suitable for implementing examples disclosed herein according to one example.

FIG. 7 is a block diagram of the computing device 16 suitable for implementing examples according to one example. The computing device 16 may comprise any computing or electronic device capable of including firmware, hardware, and/or executing software instructions to implement the functionality described herein, such as a computer server, a desktop computing device, a laptop computing device, or the like. The computing device 16 includes the processor device 32, the system memory 34, and a system bus 64. The system bus 64 provides an interface for system components including, but not limited to, the system memory 34 and the processor device 32. The processor device 32 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 34 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 16. The volatile memory 68 may also include a high-speed RAM, such as static RAM, for caching data.

The computing device 16 may further include or be coupled to a non-transitory computer-readable storage medium such as a storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like.

A number of modules can be stored in the storage device 18 and in the volatile memory 68, including an operating system and one or more program modules, such as the OFDM profile generator 36, which may implement the functionality described herein in whole or in part. All or a portion of the examples may be implemented as a computer program product 74 stored on a transitory or non-transitory computer-usable or computer-readable storage medium, such as the storage device 18, which includes complex programming instructions, such as complex computer-readable program code, to cause the processor device 32 to carry out the blocks described herein. Thus, the computer-readable program code can comprise software instructions for implementing the functionality of the examples described herein when executed on the processor device 32. The processor device 32, in conjunction with the OFDM profile generator 36 in the volatile memory 68, may serve as a controller, or control system, for the computing device 16 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 32 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 16 may also include the communications interface 78 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

identifying, by a computing device, a plurality of cable modems (CMs) serviced by a cable management termination system (CMTS), each of the CMs being associated with a particular bandwidth service tier of a plurality of bandwidth service tiers;

grouping, by the computing device, based on the bandwidth service tier with which each CM is associated, the plurality of CMs into a quantity of groups of CMs;

generating, for each respective CM in each group of CMs, a CM orthogonal frequency division multiplexing (OFDM) profile; and generating a plurality of group OFDM profiles, each respective group OFDM profile being generated based on the CM OFDM profiles of the CMs in a respective group of CMs and identifying, for each subcarrier of a plurality of subcarriers, a quadrature amplitude modulation (QAM) order.

2. The method of claim 1, further comprising:

determining a quantity of OFDM profiles to implement on the CMTS, wherein a quantity of the plurality of bandwidth service tiers is greater than the quantity of OFDM profiles to implement;

and wherein grouping, by the computing device, based on the bandwidth service tier with which each CM is associated, the plurality of CMs into the quantity of groups of CMs further comprises:

grouping, based on the bandwidth service tier of each CM, the plurality of CMs into the quantity of groups of CMs equal to or fewer than the quantity of OFDM profiles by:

generating, by the computing device, a plurality of groups of CMs, each group of CMs comprising those CMs of the plurality of CMs in a same bandwidth service tier;

iteratively:

generating a sorted list of the plurality of groups of CMs based on a quantity of CMs in each group of CMs; and combining, by the computing device, two groups of CMs of the plurality of groups of CMs identified in the sorted list having a least quantity of CMs to form a new group of CMs and reduce a quantity of the groups of CMs of the plurality of groups of CMs by one;

until the quantity of the groups of CMs of the plurality of groups of CMs equals the quantity of the OFDM profiles.

3. The method of claim 1, wherein generating, by the computing device, the group OFDM profile for each group of CMs further comprises:

for a first group of CMs of the quantity of groups of CMs generating a plurality of CM OFDM profiles by:

for each respective CM in the first group of CMs:

determining, for each respective subcarrier of the plurality of subcarriers, a QAM order for the respective subcarrier based at least in part on a signal-to-noise ratio (SNR) for the respective subcarrier of the respective CM; and determining a CM OFDM profile for the respective CM that identifies the QAM order determined for each respective subcarrier of the plurality of subcarriers; and generating a group OFDM profile for the first group of CMs based on the plurality of CM OFDM profiles.

4. The method of claim 3, wherein generating the group OFDM profile for the first group of CMs based on the plurality of CM OFDM profiles comprises:

for each respective subcarrier of the plurality of subcarriers:

determining a most occurring QAM order of a plurality of QAM orders that is identified for the respective subcarrier in the CM OFDM profiles; and selecting the most occurring QAM order as the QAM order for the respective subcarrier in the group OFDM.

13

5. The method of claim 3, determining, for each respective subcarrier of the plurality of subcarriers, a QAM order for the respective subcarrier based at least in part on a signal-to-noise ratio (SNR) for the respective subcarrier of the respective CM further comprises:

determining the QAM order for a first subcarrier of the plurality of subcarriers at least in part in accordance with a following formula:

$$b_{m,i} = \log_2\left(1 + \frac{\gamma_{m,i}}{\Gamma + \gamma_{margin}}\right)$$

wherein $\gamma_{m,i}$ is the SNR for a respective CM m on subcarrier i, $\gamma_{margin}$=0 (dB) for a current system performance margin, and $\Gamma$ for a SNR Gap, wherein SNR Gap $\Gamma$ is a system parameter that is determined by error-correcting code used by the communication protocol and provides a tolerance of noise of the system compared to that of a parity system without error-correcting codes, $\gamma_{margin}$ is an additional noise tolerance when a particular QAM order is chosen.

6. The method of claim 1, wherein generating, by the computing device, the group OFDM profile for each group of CMs further comprises:

for each respective group of CMs of the quantity of groups of CMs, generating a plurality of CM OFDM profiles by:

for each respective CM in the respective group of CMs:

determining, for each respective subcarrier of the plurality of subcarriers, a QAM order for the respective subcarrier based at least in part on a signal-to-noise ratio (SNR) for the respective subcarrier of the respective CM; and determining a CM OFDM profile for the respective CM that identifies the QAM order determined for each respective subcarrier of the plurality of respective subcarriers; and generating a group OFDM profile for the respective group of CMs based on the plurality of CM OFDM profiles.

7. The method of claim 6, wherein generating a group OFDM profile for the respective group of CMs based on the plurality of CM OFDM profiles comprises:

for each respective group of CMs:

for each respective subcarrier of the plurality of subcarriers:

determining a most occurring QAM order of a plurality of QAM orders that is identified for the respective subcarrier in the CM OFDM profiles for the CMs in the respective group of CMs; and selecting the most occurring QAM order as the QAM order for the respective subcarrier in the group OFDM for the respective group of CMs.

8. The method of claim 1, further comprising:

provisioning, by the computing device, the CMTS to use the group OFDM profiles for communications with the plurality of CMs.

9. A computing device, comprising:

a memory; and a processor device coupled to the memory and operable to:

identify a plurality of cable modems (CMs) serviced by a cable management termination system (CMTS), each of the CMs being associated with a particular bandwidth service tier of a plurality of bandwidth service tiers;

group, based on the bandwidth service tier with which each CM is associated, the plurality of CMs into a quantity of groups of CMs;

generate, for each respective CM in each group of CMs, a CM orthogonal frequency division multiplexing (OFDM) profile; and generate a plurality of group OFDM profiles, each respective group OFDM profile being generated based on the CM OFDM profiles of the CMs in a respective group of CMs and identifying, for each subcarrier of a plurality of subcarriers, a quadrature amplitude modulation (QAM) order.

10. The computing device of claim 9, wherein the processor device is further operable to:

determine a quantity of OFDM profiles to implement on the CMTS, wherein a quantity of the plurality of bandwidth service tiers is greater than the quantity of OFDM profiles to implement;

and wherein to group, by the computing device, based on the bandwidth service tier with which each CM is associated, the plurality of CMs into the quantity of groups of CMs, the processor device is further to:

group, based on the bandwidth service tier of each CM, the plurality of CMs into the quantity of groups of CMs equal to or fewer than the quantity of OFDM profiles by:

generating, by the computing device, a plurality of groups of CMs, each group of CMs comprising those CMs of the plurality of CMs in a same bandwidth service tier;

iteratively:

generating a sorted list of the plurality of groups of CMs based on a quantity of CMs in each group of CMs; and combining, by the computing device, two groups of CMs of the plurality of groups of CMs identified in the sorted list having a least quantity of CMs to form a new group of CMs and reduce a quantity of the groups of CMs of the plurality of groups of CMs by one;

until the quantity of the groups of CMs of the plurality of groups of CMs equals the quantity of the OFDM profiles.

11. The computing device of claim 9, wherein to generate the group OFDM profile for each group of CMs, the processor device is further operable to:

for a first group of CMs of the quantity of groups of CMs generate a plurality of CM OFDM profiles by:

for each respective CM in the first group of CMs:

determine, for each respective subcarrier of the plurality of subcarriers, a QAM order for the respective subcarrier based at least in part on a signal-to-noise ratio (SNR) for the respective subcarrier of the respective CM; and determine a CM OFDM profile for the respective CM that identifies the QAM order determined for each respective subcarrier of the plurality of subcarriers; and generate a group OFDM profile for the first group of CMs based on the plurality of CM OFDM profiles.

12. The computing device of claim 11, wherein to generate the group OFDM profile for the first group of CMs based on the plurality of CM OFDM profiles, the processor device is further operable to:

for each respective subcarrier of the plurality of subcarriers:

determine a most occurring QAM order of a plurality of QAM orders that is identified for the respective subcarrier in the CM OFDM profiles; and select the most occurring QAM order as the QAM order for the respective subcarrier in the group OFDM.

13. The computing device of claim 9, wherein to generate the group OFDM profile for each group of CMs, the processor device is further operable to:

for each respective group of CMs of the quantity of groups of CMs, generate a plurality of CM OFDM profiles by:

for each respective CM in the respective group of CMs:

determine, for each respective subcarrier of the plurality of subcarriers, a QAM order for the respective subcarrier based at least in part on a signal-to-noise ratio (SNR) for the respective subcarrier of the respective CM; and determine a CM OFDM profile for the respective CM that identifies the QAM order determined for each respective subcarrier of the plurality of respective subcarriers; and generate a group OFDM profile for the respective group of CMs based on the plurality of CM OFDM profiles.

14. The computing device of claim 13, wherein to generate a group OFDM profile for the respective group of CMs based on the plurality of CM OFDM profiles, the processor device is further operable to:

for each respective group of CMs:

for each respective subcarrier of the plurality of subcarriers:

determine a most occurring QAM order of a plurality of QAM orders that is identified for the respective subcarrier in the CM OFDM profiles for the CMs in the respective group of CMs; and select the most occurring QAM order as the QAM order for the respective subcarrier in the group OFDM for the respective group of CMs.

15. The computing device of claim 9, wherein the processor device is further operable to:

provision the CMTS to use the group OFDM profiles for communications with the plurality of CMs.

16. A non-transitory computer-readable storage medium that includes executable instructions to cause a processor device to:

identify a plurality of cable modems (CMs) serviced by a cable management termination system (CMTS), each of the CMs being associated with a particular bandwidth service tier of a plurality of bandwidth service tiers;

group, based on the bandwidth service tier with which each CM is associated, the plurality of CMs into a quantity of groups of CMs;

generate, for each respective CM in each group of CMs, a CM orthogonal frequency division multiplexing (OFDM) profile; and generate a plurality of group OFDM profiles, each respective group OFDM profile being generated based on the CM OFDM profiles of the CMs in a respective group of CMs and identifying, for each subcarrier of a plurality of subcarriers, a quadrature amplitude modulation (QAM) order.

17. The non-transitory computer-readable storage medium of claim 16, wherein the instructions further cause the processor device to:

determine a quantity of OFDM profiles to implement on the CMTS, wherein a quantity of the plurality of bandwidth service tiers is greater than the quantity of OFDM profiles to implement;

and wherein to group, by the computing device, based on the bandwidth service tier with which each CM is associated, the plurality of CMs into the quantity of groups of CMs, the instructions further cause the processor device to:

group, based on the bandwidth service tier of each CM, the plurality of CMs into the quantity of groups of CMs equal to or fewer than the quantity of OFDM profiles by:

generating, by the computing device, a plurality of groups of CMs, each group of CMs comprising those CMs of the plurality of CMs in a same bandwidth service tier;

iteratively:

generating a sorted list of the plurality of groups of CMs based on a quantity of CMs in each group of CMs; and combining, by the computing device, two groups of CMs of the plurality of groups of CMs identified in the sorted list having a least quantity of CMs to form a new group of CMs and reduce a quantity of the groups of CMs of the plurality of groups of CMs by one;

until the quantity of the groups of CMs of the plurality of groups of CMs equals the quantity of the OFDM profiles.

18. The non-transitory computer-readable storage medium of claim 16, wherein to generate the group OFDM profile for each group of CMs, the instructions are further operable to cause the processor device to:

for a first group of CMs of the quantity of groups of CMs generate a plurality of CM OFDM profiles by:

for each respective CM in the first group of CMs:

determine, for each respective subcarrier of the plurality of subcarriers, a QAM order for the respective subcarrier based at least in part on a signal-to-noise ratio (SNR) for the respective subcarrier of the respective CM; and determine a CM OFDM profile for the respective CM that identifies the QAM order determined for each respective subcarrier of the plurality of subcarriers; and generate a group OFDM profile for the first group of CMs based on the plurality of CM OFDM profiles.

19. The non-transitory computer-readable storage medium of claim 18, wherein to generate the group OFDM profile for the first group of CMs based on the plurality of CM OFDM profiles, the instructions are further operable to cause the processor device to:

for each respective subcarrier of the plurality of subcarriers:

determine a most occurring QAM order of a plurality of QAM orders that is identified for the respective subcarrier in the CM OFDM profiles; and select the most occurring QAM order as the QAM order for the respective subcarrier in the group OFDM.

20. The non-transitory computer-readable storage medium of claim 16, wherein to generate the group OFDM profile for each group of CMs, the instructions are further operable to cause the processor device to:

for each respective group of CMs of the plurality of groups of CMs, generate a plurality of CM OFDM profiles by:

for each respective CM in the respective group of CMs:

determine, for each respective subcarrier of the plurality of subcarriers, a QAM order for the respective subcarrier based at least in part on a signal-to-noise ratio (SNR) for the respective subcarrier of the respective CM; and determine a CM OFDM profile for the respective CM that identifies the QAM order determined for each respective subcarrier of the plurality of respective subcarriers; and generate a group OFDM profile for the respective group of CMs based on the plurality of CM OFDM profiles.

* * * * *